United States Patent [19]
Obara

[11] Patent Number: 4,810,138
[45] Date of Patent: Mar. 7, 1989

[54] TAP HOLDER
[75] Inventor: Motonori Kobara, Futtsu, Japan
[73] Assignee: Kuroda Seiko Company Limited, Kanagawa, Japan
[21] Appl. No.: 92,622
[22] Filed: Sep. 3, 1987
[30] Foreign Application Priority Data Sep. 9, 1986 [JP] Japan .............................. 61-138081
Nov. 21, 1986 [JP] Japan .............................. 61-179212

[51] Int. Cl.$^4$ ............................................. B23Q 5/22
[52] U.S. Cl. ..................................... 408/139; 408/140
[58] Field of Search ................................ 408/139, 140

[56] References Cited
U.S. PATENT DOCUMENTS 4,386,689  6/1983  Kato .................................. 408/139 X
4,708,538  11/1987  Kubo et al. ....................... 408/139 X Primary Examiner—Eugene F. Desmond
Attorney, Agent, or Firm—Peter J. Georges

[57] ABSTRACT

A tap holder for detachably securing a tool to a machine tool including a main portion having a shank which is to be secured to a main shaft of the machine tool, a quick change portion having a float shaft which is inserted into a hole formed in the main portion and a quick change mechanism including a clamp collar, a first coiled spring for pressing the clamp collar toward the main portion, steel balls arranged in holes formed in the float shaft, a supporting ring slidably inserted into the float shaft and a second coiled spring for pressing the supporting ring toward a tool, and a tool supporting portion including a driven shaft whose rear end has a recess formed therein and is inserted into the float shaft and a torque control mechanism. By moving the clamp collar toward the main portion against the resilient force of the first coiled spring, the engagement between the steel balls and the recess of the driven shaft is released and the tool holding portion is removed from the quick change portion.

4 Claims, 3 Drawing Sheets

TAP HOLDER

BACKGROUND OF THE INVENTION

1. Field of the Invention

This invention relates to a tap holder comprising a main portion having a shank which is to be coupled with a main shaft of a machine tool, a quick change portion secured to said main portion, and a tool holding portion which is detachably coupled with said quick change portion and has a torque control function. Such a tap holder is mainly used for a machining center.

2. Description of the Related Art

A tap holder comprising a main portion having a shank which is to be secured to an axial hole of a main shaft of a machine tool, a tool holding portion having a torque control function and a quick change portion which couples said main portion and tool holding portion with each other has been disclosed in Japanese Patent Publication Nos. 50-5,102 and 58-41,974. In such a known tap holder, upon exchanging a tool, the quick change mechanism is moved toward the main shaft of the machine tool, so that when a tapping torque exceeds a nominal value and the clutch is intermittently brought into the racing, there is a danger that the tool holding portion might be removed from the quick change portion.

In the tap chuck described in said Japanese Patent Publication No. 50-5102, the torque control mechanism of the tool holding portion is constituted by a clutch including a torque adjusting cam and a torque adjusting member made of hard polyurethane rubber, and the torque control is effected by urging a movable cam against a fixed cam by means of a resilient compression force of the hard polyurethane rubber. During the operation, when the clutch is brought into the racing, the fixed cam is inserted and removed intermittently into and out of a recess, so that the hard polyurethane rubber is brought into the compressed and non-compressed conditions alternately, which affects the normal operation of the quick change portion. That is to say, the tool holding portion is coupled with a float shaft of the quick change portion by means of steel balls and the coupling can be released by moving a clamp collar toward the main shaft of the machine tool so that the steel balls can move freely in a radial direction of the float shaft. However, in the racing condition, since the intermittent force generated by the torque control mechanism functions to pull the tool holding portion toward the main portion, the intermittent force serves to rotate the steel balls and move the clamp collar toward the main portion, the tool holding portion is decoupled from the quick change portion and the tool holding portion might be left on a workpiece.

In the tool holder disclosed in said Japanese Patent Publication No. 58-41,974, the torque setting is effected with the aid of a belleville spring. In this known tool holder, since use is made of the same quick change mechanism as that explained above, the above mentioned drawback could not be overcome.

In the tap holder used in the machining center, the tool holding portion, i.e. a tap collet must comprise a means for preventing the overload from being transferred to the tap or tool. Such an overload preventing means has been described in Japanese Utility Model Laid-open Publication Nos. 55-142,222 and 59-32,724. However, these known tap holders have such drawbacks that they could not be used for a long time due to a, rapid, wear of friction parts and sufficient safety could not be attained.

SUMMARY OF THE INVENTION

It is a primary object of the present invention to provide a tap holder comprising a tool holding portion having a torque control function, a main portion which is to be secured to a main shaft of a machine tool, and a quick change mechanism for coupling said tool holding portion and main portion with each other, in which any influence upon the quick change mechanism due to an axial force which is produced upon the racing can be effectively prevented, so that the tool holding portion could be prevented from being removed and high safety can be attained.

It is another object of the invention to provide a tap holder which can remove the above mentioned drawbacks of the known tap collet and can attain a predetermined nominal torque for a long time, and which can be used for a long time by decreasing the influence of the frictional force as small as possible.

According to the invention, in a tap holder comprising a main portion having a shank which is to be coupled with a main shaft of a machine tool, a quick change portion having a portion which is secured to the main portion and a quick change mechanism having a clamp collar, and a tool holding portion including a portion which is detachably coupled with said quick change mechanism and a torque control mechanism, the improvement is characterized in that the quick change mechanism comprises a spring for pressing the clamp collar toward the main portion and said tool holding portion is removed from the quick change mechanism by moving the clamp collar toward the tool holding portion.

DESCRIPTION OF THE PREFERRED EMBODIMENT

Figure 1:
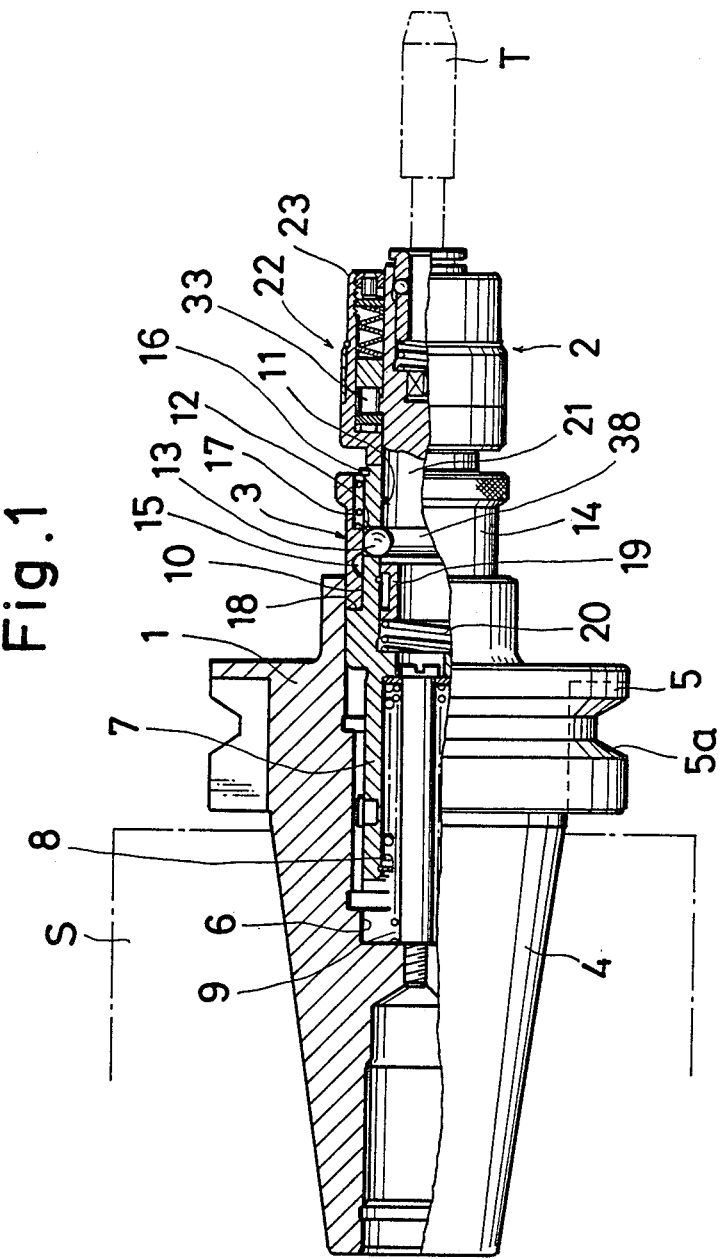
FIG. 1 is a half cross sectional view showing an embodiment of the tap holder according to the invention.
Figure 2:
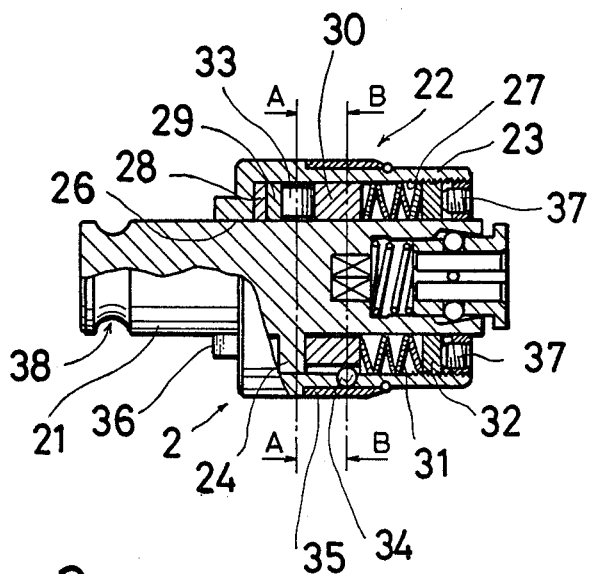
FIG. 2 is a cross sectional view illustrating a tool holding portion in an enlarged scale.
Figure 3:
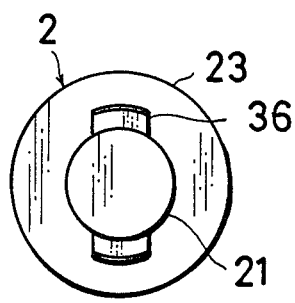
FIG. 3 is a side view depicting the tool holding portion.

FIG. 1 is a half cross sectional view showing an embodiment of the tap holder according to the invention. The tap holder is mainly composed of a main portion 1 which is to be secured to a main shaft S of a machine tool, a tool holding portion 2 constituting a tap collet to which a tap T is secured, and a quick change portion 3 for coupling the main portion 1 and the tool holding portion 2 with each other. The main portion 1 comprises a shank portion 4 which is to be inserted into an axial hole formed in the main shaft S and a flange portion 5 having a V-shaped recess 5a formed in an outer surface thereof. The flange portion 5 has a hole 6 formed in an axial direction, and in this hole 6 there is slidably inserted a pitch error correcting float shaft 7 which forms a part of the quick change portion 3. Between a bottom end of the hole 6 and the float shaft 7 is arranged a pitch correcting mechanism including compressed coiled springs 8 and 9. An outer diameter of a front end 10 of the float shaft 7 is made smaller than that of a rear end which is inserted into the main portion 1. In the front end 10 of the float shaft 7 there are formed a plurality of through holes 12 which communicate with a central hole 11, and a plurality of steel balls 13 are inserted into the holes 12. On an outer, surface of the front end 10 of the float shaft 7 there is rotatably inserted a clamp collar 14 in which there is formed a recess 15 having a semicircular cross section into which the steel balls 13 can be inserted. The clamp collar 14 is always pushed toward the main shaft M by means of a spring 17 arranged between a stopper ring 16 secured to the front end 10 of the float shaft 7 and the clamp collar 14. The rear end of the clamp collar 14 is urged against a step surface 18 formed between the front end 10 and a portion of the float shaft 7 which is inserted into the main portion 1. The steel balls 13 are supported by a supporting ring 19 which is biased forwardly by means of a compressed coiled spring 20 when the tap T is not secured to the tap holder. The tool holding portion 2 comprises a driven shaft 21 having a front end into which the tap T is clamped and a rear end which is inserted into the central hole 11 of the float shaft 7. The tool holding portion 2 further comprises a torque control portion 22. The torque control portion 22 may be formed by any known mechanism.

Figure 4:
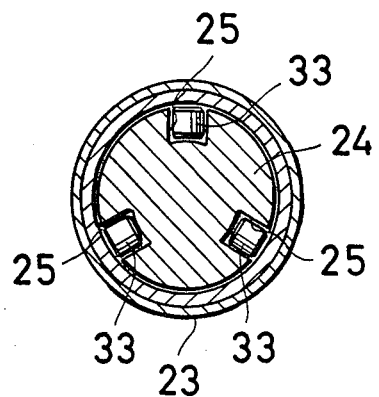
FIGS. 4 and 5 are cross sectional views cut along lines A—A and B—B, respectively shown in FIG. 2.
Figure 5:
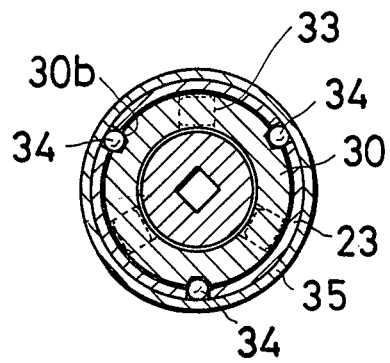
Figure 6:
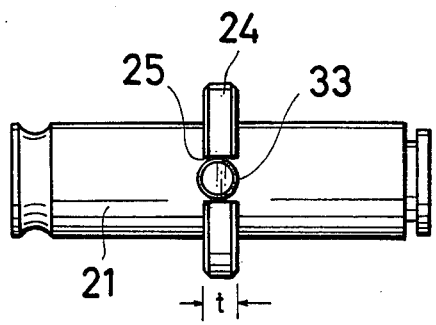
FIG. 6 is a side view showing a relation between a flange portion of a driven shaft and rollers.
Figure 7:
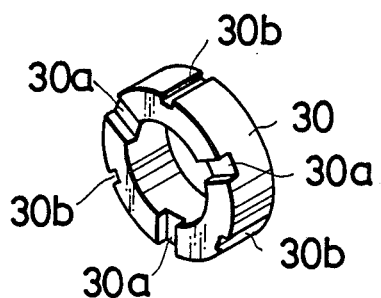
FIG. 7 is a perspective view illustrating a clutch.

FIGS. 2 to 7 show an embodiment of the torque control portion 22 comprising belleville springs. In a main body 23 of the tool holding portion 2 there is inserted the driven shaft 21 which supports the tool T. The driven shaft 23 comprises a flange 24 at its middle portion as illustrated in FIGS. 4 and 6. Around the flange 24 there are formed equidistantly three notches 25 whose width is larger than a thickness t of the flange 24. The main body 23 of the tool holding portion 2 comprises a relatively small hole 26 having a diameter corresponding to an outer diameter of the driven shaft 21 and a relatively large opening 27 into which the flange 24 of the driven shaft 21 can be inserted. In the opening 27 there are arranged a thrust bearing 28, bearing ring 29, flange 24, clutch piece 30, a plurality of belleville springs 31 serving as resilient members and torque adjusting screw 32 successively in this order viewed from the main shaft S. In the notches 25 formed in the flange 24 there are arranged rollers 33 which are rotatable about shafts extending in the radial direction of the flange 24. The outer diameter of the rollers 33 is slightly larger than the thickness t of the flange 24. Therefore, the rollers 33 are brought into contact with the surface of the bearing ring 29 and project slightly toward the clutch piece 30. As depicted in FIG. 7 in a side surface of the clutch piece 30 there are formed equidistantly three clutch recesses 30a, and in the outer surface of the clutch piece there are formed equidistantly three locking recesses 30b. The clutch recesses 30a have such a width that the rollers 33 are engaged with the recesses. As shown in FIG. 5, steel balls 34 are inserted in holes formed in the main body 23 of the tool holding portion 2 and are supported by a supporting ring 35. Portions of the steel balls 34 are projected into the locking recesses 30b of the clutch piece 30 so that the clutch piece 30 is locked with respect to the main body 23 in the rotational direction. At the rear end of the main body 23 of the tool holding portion 2 there are formed keys 36 for transmitting the rotational force of the main shaft S to the main body 23.

The main portion 1 and the main body 23 of the tool holding portion 2 are locked with each other in the rotational direction by means of the engagement between the key 36 formed at the rear end of the main body 23 of the tool holding portion 2 and key recess (not shown) formed in the front end of the float shaft 7, so that the torque is transferred from the main shaft S to the tap T. A plurality of locking screws 37 and a connecting recess 38 are formed in the outer surface of the driven shaft 21.

Upon securing the tool holding portion 2 to the main portion 1, the key 36 of the tool holding portion is aligned with the key recess of the float shaft 7 and then the driven shaft 21 of the tool holding portion 2 is inserted into the central hole 11 of the float shaft 7 until the rear end of the main body 23 of the tool holding portion 2 is brought into contact with the front end of the float shaft 7. Then the rear end of the driven shaft 21 pushes the supporting ring 19 toward the main shaft S, so that the steel balls 13 are clamped into the recess 38 of the driven shaft 21 and the clamp collar 14 is moved toward the main shaft S due to the resilient force of the spring 17. In this manner the tool holding portion 2 is automatically coupled with the main portion 1.

Upon exchanging the tool T, the clamp collar 14 is moved toward the tool T against the resilient force of the spring 17. Then the steel balls 13 are moved into the recess 15 formed in the inner surface of the clamp collar 14 and the coupling between the steel balls 13 and the recess 38 is released. In this manner, the tool holding portion 2 having the tool T secured thereto can be removed from the main portion 1. In this manner, in the tap holder according to the invention, the tool can be simply secured to and removed from the main portion 1 by one touch movement.

In the above embodiment of the tap holder according to the invention, by rotating the screw 32 screwed in the main body 23 of the tool holding portion 2 it is possible to adjust the torque. When the cutting torque on the tool is extremely larger than the nominal torque and the driven shaft 21 could not be rotated relative to the main body 23 of the tool holding portion 2, the clutch piece 30 which is locked to the main body 23 by the engagement of the balls 34 with the locking recesses 30b is subjected to the rotational force. Then the clutch piece 30 is shifted forwardly against the resilient force of the belleville springs 31 and is rotated over the rollers 33. Then the rollers 33 are clamped into the recesses 30a of the clutch piece 30. Next, the clutch piece 30 is shifted again in the axial direction and is rotated. In this manner, the clutch piece 30 is moved. reciprocally in the axial direction and is rotated. During the rotation of the clutch piece 30, the rollers 33 are also rotated by means of the clutch piece 30. This rotational force of the rollers 33 is transferred to the bearing ring 29 and the bearing ring 29 is also rotated together with the rollers 33. Since the thrust bearing 28 is arranged between the bearing ring 29 and the bottom end of the opening 27, the bearing ring 29 can rotate smoothly and friction is not substantially produced between the rollers 33 and the bearing ring 29. Similarly, friction is not substantially produced between the clutch piece 30 and the rollers 33. In this manner, the forced rotation of the rollers 33 during the racing can be received by the bearing ring 29 as the rotational movement and the rollers 33 can be effectively protected against the wear. Moreover, since the rollers 33 are only rotated and could not move in the axial direction, the rollers 33 are prevented from being slipped. Further, during the racing the belleville springs 31 can not rotate together with clutch piece 30.

The present invention is not limited to the embodiment explained above, but may be modified in various ways within the scope of the invention.

In the above embodiment, the thrust bearing 28 is formed by a roller bearing, but it may be formed by a ball bearing.

In the above embodiment, there is provided the float shaft 7 for correcting the pitch error of a work screw, but the pitch error correcting function may be dispensed with. In such a case, a part of the float shaft 7 may be fixed to the main portion 1.

Further, in the above embodiment, there is formed the V-shaped recess 5a in the flange 5 of the main portion 1 so that the tap holder may be applied to the machining center, but the tap holder according to the invention may be also used for universal machines which do not utilize the flange. In this case, the shank portion 4 may be formed as a straight shank.

As explained above in detail, in the tap holder according to the invention, the tool holding portion could never be removed from the main portion so long as the clamp collar is shifted toward the main shaft, because the clamp collar is locked in such a condition that the clamp collar is urged against the step surface of the float shaft, so that the clamp collar could never be moved toward the tool during racing.

Further, the tap collet is so constructed that the forced rotation of the rollers during the racing is received by the surface of the bearing ring as the rotational movement, and thus any damage due to the friction between the rollers and bearing ring and the friction between the bearing ring and clutch can be prevented. Therefore, the tap holder can be used for a very long time period. Moreover, the rollers are not shifted in the axial direction, but are only rotated, so that the sliding movement of the rollers is prevented. This result permits the rollers to have improved durability. Further, during the racing, the resilient member for pressing the clutch against the bearing ring is not rotated together with the clutch, so that the resilient member can be used for a long time and the variation of the nominal torque can be left very small. Therefore, the screw cutting can be carried out precisely for a long time period.

What is claimed is:

1. A tap holder comprising:
   a main portion having a shank which is to be coupled with a main shaft of a machine tool, and an axial hole formed in said main portion;
   a quick change portion having a float shaft which is slidably inserted into said axial hole formed in said main portion and which has recesses, and a quick change mechanism having a clamp collar which is slidably arranged around said float shaft and which has holes therein, balls inserted in said holes, and a first spring means for pressing the clamp collar towards the main portion;
   a toll holding portion having a driven shaft rotatably inserted in said float shaft and having ring-shaped recess into which said balls are inserted to clamp the driven shaft within said float shaft and a flange portion having notches formed therein, and a main portion arranged around the driven shaft and being coupled with said float shaft to rotate therewith, said tool holding portion being removed from the quick change mechanism when the clamp collar is moved toward the tool holding portion against the force of said first spring means; and
   a torque control portion including a ring-shaped clutch member arranged rotatably around said driven shaft and having recesses, rollers arranged in said notches formed in said flange portion of the driven shaft and being insertable into said recesses formed in said clutch member, a second spring means arranged around said driven shaft for pushing the clutch member towards said rollers, the rotation force of the main portion of the tool holding portion being disconnected from the driven shaft when the clutch member is moved towards the tool side against the force of said second spring means.

2. The tap holder according to claim 1, wherein said second spring means of the torque control portion includes a plurality of belleville springs.

3. The tap holder according to claim 1, wherein said torque control portion further includes a torque adjusting screw means for adjusting the force of said second spring means.

4. The tap holder according to claim 1, wherein said torque control portion further comprises a bearing ring arranged around the driven shaft for supporting the rollers rotatably and a thrust bearing arranged around the drive shaft for supporting the bearing ring rotatably.

* * * * *